CELLULOSIC FIBROUS SHEET HAVING A CONTENT OF AT LEAST 90% ALPHA CELLULOSE, AN AIR PERMEABILITY (GURLEY) OF 1-10 SECONDS, A THICKNESS OF 0.028 - 0.038", AND UNIFORM "FORMATION"

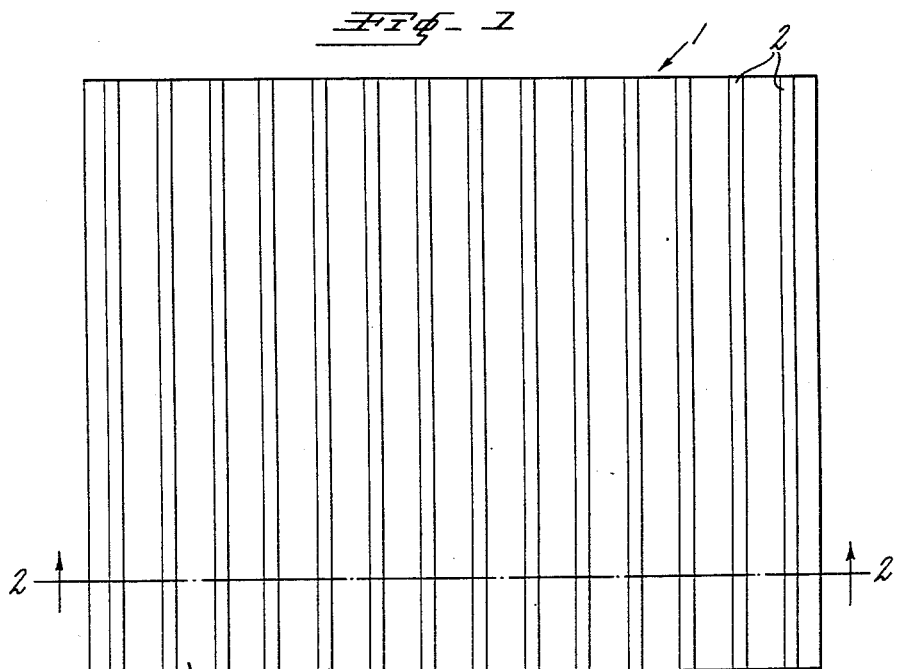
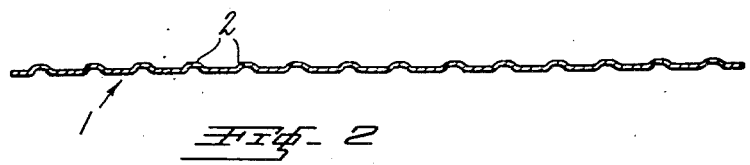
LIQUID PERMEABLE BATTERY SEPARATOR OF CELLULOSIC FIBROUS SHEET IMPREGNATED WITH C-STAGE PHENOLIC RESIN FORMED FROM A-STAGE RESIN DEPOSITED FROM SOLUTION IN ALCOHOL-WATER MIXTURE OR ACETONE-WATER MIXTURE Feb. 22, 1955     E. C. UHLIG ET AL     2,702,758
PROCESS OF MAKING A BATTERY SEPARATOR
Filed Aug. 4, 1951     2 Sheets-Sheet 2

↓

IMPREGNATE SHEET WITH 13-50% SOLUTION OF A-STAGE PHENOL-FORMALDEHYDE RESIN IN SOLVENT COMPOSED OF 10-50% OF WATER AND 90-50% OF ACETONE OR A $C_1$ TO $C_3$ ALKANOL, TO PICKUP OF 120-250% OF SOLUTION AND OF 25-50% OF RESIN

↓

DRY IMPREGNATED SHEET TO 10-25% VOLATILE CONTENT

↓

EMBOSS TO FORM INTEGRAL PROTUBERANT RIBS

↓

HEAT AT 300-550°F., AND PREFERABLY AT 400-500°F., TO CURE THE RESIN

↓

CUT TO WIDTH AND LENGTH

↓

FINISHED LIQUID PERMEABLE BATTERY SEPARATOR

Fig. 3

INVENTORS
EDWIN C. UHLIG
LINWOOD A. MURRAY, JR.
BY
Robert J. Patterson
ATTORNEY

United States Patent Office 2,702,758
Patented Feb. 22, 1955

2,702,758

PROCESS OF MAKING A BATTERY SEPARATOR

Edwin C. Uhlig, Greenwood, and Linwood A. Murray, Jr., Cranston, R. I., assignors to United States Rubber Company, New York, N. Y., a corporation of New Jersey Application August 4, 1951, Serial No. 240,314

7 Claims. (Cl. 117—4)

This invention is an improvement in the art of liquid permeable phenol-formaldehyde resin-impregnated cellulosic fiber sheet battery separators, such as those of the type exemplified by Uber 2,543,137.

In the accompanying drawings:

Fig. 1 is a plan view of a separator of our invention.
Fig. 2 is a sectional view on the line 2—2 of Fig. 1.
Fig. 3 is a diagrammatic portrayal of the process used in making our separator.

The principal object of the present invention is to provide battery separators of the above type which exhibit higher abrasion-resistance which is a very important property in a battery separator because if the separator wears through because of vibrational contact with the plates mechanical short-circuiting will occur requiring replacement of the battery. Our separators exhibit considerably higher abrasion-resistance than separators made for example with an all-water solution of an A-stage phenol-formaldehyde resin in accordance with the prior art as exemplified by the above-identified Uber patent. Another object is to provide a separator combining outstanding abrasion-resistance with good physical strength, low brittleness and other mechanical properties required in a battery separator, as compared to the excessive brittleness of a separator made with 100% alcohol as the solvent for the A-stage phenolic resin. Another object is to provide a battery separator which combines these good mechanical properties with good chemical and electrical properties. Another object is to provide a technique for making battery separators of the above type which enables the use of phenol-formaldehyde resins which do not possess the high degree of water dilutability required by the prior art as exemplified by the above-mentioned Uber patent. Another object is to make feasible the commercial manufacture, with ordinary impregnating equipment, of battery separators from a cellulosic fibrous sheet which possesses too low mechanical strength when wet with a solution of resin in water only as the solvent to permit its being handled with such ordinary impregnating equipment. Another object is to provide a process of making embossed battery separators of the above type which enables the embossing step to be carried out substantially at room temperature without cracking or mechanical injury to the sheet and without curing of the resin while under embossing pressure. Another object is to provide a process of making liquid permeable resin-impregnated battery separators which are competitive in performance and cost of manufacture with wood separators. Another object is to provide a battery separator of the above type having an electrical resistance in battery acid of not over 0.05 ohms per square inch for a web thickness of approximately 0.033" and at the same time having good resistance to battery acid, high resistance to abrasion and all the other qualities required of a battery separator.

Our invention is based upon our discovery that a liquid permeable resin-impregnated cellulosic fibrous sheet battery separator fulfilling the foregoing objects can be prepared by using an alcohol-water or acetone-water solution of an A-stage phenol-formaldehyde resin for impregnating the cellulosic fibrous sheet. We have found that use of such an alcohol-water or acetone-water solution makes possible the commercial production of phenolic resin-impregnated cellulosic fibrous sheet separators which are particularly distinguished by their outstanding abrasion resistance coupled with excellent resistance to battery acid, low electrical resistance and good mechanical strength. We have found that the alcohol-water or acetone-water solvent makes feasible the use of phenol-formaldehyde resins which are less highly dilutable with water than required by the above-cited Uber patent, and in fact resins which are dilutable with as little as 3 parts of water per part of resin, and even with as little as 0.1 part of water per part of resin. In addition, the use of the alcohol or acetone in conjunction with water as the solvent enables the use of a weaker cellulosic fibrous sheet (e. g., a short fiber wood pulp sheet) than could be used where water alone is employed as the resin solvent, and also makes feasible the processing of a sheet which could not be processed without expensive special equipment if water alone were the resin solvent; the processing referred to here is the handling of the sheet during impregnation; if the sheet is unduly tender or weak when wet with the aqueous resin solution, processing is seriously interfered with and defective production runs excessively high. We have also found that the water tolerance of low water-dilutable A-stage phenol-formaldehyde resins is greatly enhanced by the presence of the alcohol or acetone and that alcohol or acetone greatly reduces the swelling of the cellulosic fibrous sheet by the resin solution thereby causing the wet sheet to retain a greater proportion of its dry strength so that it can be handled more easily and on ordinary equipment. At the same time we do not use such a proportion of the alcohol or acetone in the solvent as to so reduce the swelling of the fibers as to objectionably increase the electrical resistance of the resulting separator.

Our invention presents a very important advantage in that the alcohol or acetone greatly reduces the tendency of the resin to migrate to the surface of the fibrous sheet during drying. Migration of resin can be a serious problem when water alone is used to dissolve the resin particularly if the resin possesses low water dilutability. This migration severely impairs the usefulness of the separator because of the depletion of resin from the center of the sheet resulting in inadequate protection of the fibrous material in the center against the battery acid and in a concomitant increase in electrical resistance of the separator.

In practicing our invention we can use any alkanol having from one to three carbon atoms per molecule. We especially prefer to employ isopropyl alcohol or methyl alcohol. Ethyl alcohol and n-propyl alcohol could be used but they are more costly. Our solvent has a boiling point sufficiently low that it can be removed in the drying step without advancing the resin.

We dissolve the A-stage phenol-formaldehyde resin in a solvent composed of water and the alcohol or acetone in relative proportions of from 10 to 50 per cent by weight of water and correspondingly from 90 to 50 per cent by weight of the alcohol or acetone, to form a solution containing from 13 to 50 per cent by weight of non-volatile resin solids. We prefer to use from 25 to 40 per cent of water and from 75 to 60 per cent of the alcohol or acetone. We saturate the cellulosic fibrous sheet in the resin solution in such a way that it picks up from 120 to 250 per cent by weight of the solution based on the fiber.

We use a sheet containing at least 90 per cent of alpha cellulose. We prefer to use a sheet of cotton linters since such a sheet contains more than 99 per cent alpha cellulose and since a cotton linters sheet contains the longest alpha cellulose fibers that are commercially available, but we can use a sheet of alpha cellulose derived from wood and running somewhat lower in alpha cellulose content which is relatively shorter in fiber length. In general the higher the alpha cellulose content and the longer the fibers thereof the stronger the sheet and the better the separator produced.

The original sheet should have an air permeability (as measured by the well-known Gurley test) of from 1 to 10 seconds. The treatment of our invention does not materially lessen the air permeability of the sheet.

The thickness of the original fibrous sheet can range from 0.028 to 0.033". The sheet is used in a normally dry condition, generally containing from 2 to 10% by weight of water.

The original sheet must exhibit uniform "formation," a term used by the paper industry to denote uniformity of fiber distribution and homogeneity of structure. This is very important since a sheet may be satisfactory in all other respects but if it is deficient in "formation"

it will not give a satisfactory battery separator in the practice of our invention because the non-uniform fiber distribution results in non-uniform resin distribution.

We can use any A-stage phenol-formaldehyde resin which is soluble in our alcohol-water or acetone-water mixture to give a solution containing from 13 to 50 per cent by weight of non-volatile resin solids and which possesses adequate resistance to battery acid when cured to the C-stage. Those skilled in the phenol-formaldehyde resin art can readily prepare such a resin. Many such resins are well-known in the art, examples being those sold as "Durez 12704" and "Resinox 468." Although ordinary phenol is usually used in making the resin, it can be replaced with its homologs such as the cresols and xylenols.

The impregnation of the sheet is typically accomplished by first saturating it thoroughly by simply passing it through a bath of the resin solution, followed by passage through ordinary squeeze rolls to remove excess solution and leave in the sheet an amount of solution ranging from 120 to 250 per cent based on the weight of the dry fiber, which amount is sufficient upon drying and curing to leave resin in the cured sheet in an amount of from 25 to 50 per cent by weight based on the weight of dry fiber plus resin. Because of the highly absorbent nature of the sheet, it will absorb a quantity of the solution in excess of that required so that squeezing to remove the excess is required.

Care should be taken in the squeezing step to limit the squeezing pressure so as to not injure the physical properties of the fibrous web.

We prefer that the amount of resin applied range from 30 to 45 per cent by weight based on the dry fibrous sheet plus resin. At values below 30 per cent the life of the separator begins to be too short while at values above 45 per cent the electrical resistance of the separator begins to be too high.

We next dry the impregnated sheet to remove most of the water, alcohol or acetone and other volatiles, including some excess formaldehyde and free phenol. The conditions of drying are not particularly critical as long as drying is so carried out that the resin is not materially advanced. We generally dry with heated air flowing concurrently with the traveling web and having a temperature of about 300° F. at the beginning and gradually dropping in temperature to room temperature at the end of the drying zone. The sheet is in the drying device about two minutes.

We prefer to so limit the drying of the impregnated sheet that the dried sheet contains from 10 to 25 per cent (based on net dry sheet) of volatiles (mainly water and alcohol or acetone) because we have found that it is possible to emboss such a sheet to form protuberant ribs therein with cold embossing rolls or dies without cracking or weakening the sheet. It is highly advantageous to use cold, i. e., unheated, embossing equipment and it was surprising to find that if the impregnated sheet contained the indicated amount of volatiles it could be embossed in the cold. Cold embossing has the advantages of dispensing with means for heating the embossing rolls or dies, of being easier to control and of not advancing the phenolic resin so that better control of resin curing is effected.

The sheet which has been dried to the above content of volatiles does not appear wet but at the higher levels in the stated range may be damp to the touch.

If the dried sheet is not to be processed, i. e., embossed and cured, within a short time, we prefer to refrigerate it at from 40 to 50° F. until it is to be subjected to the rest of the process operations. The reasons for refrigerating the sheet during any substantial interim period are to prevent advancement of the resin to the C-stage which would occur rapidly on standing at room temperature and to prevent loss of water and other volatiles to a value below 10 per cent which would occur on standing in the open air and would cause difficulties in the cold embossing operation.

We next subject the dried sheet to embossing to deform it along spaced lines forming integral protuberances on one side of the sheet with corresponding depressions on the other side. This can be done by passing the sheet continuously through spaced cooperating embossing rolls, one of which has upstanding ribs and the other of which has corresponding grooves. We can also emboss batchwise with a closed flat plate male and female embossing die. As previously indicated we prefer that the embossing rolls or die not be supplied with heat. However we can use heated embossing equipment carrying out a substantial portion or all of the curing of the resin to the C-stage therein.

We often prefer to preheat the dried sheet, intermediate the drying step and the embossing step, to a moderate temperature of say 200–250° F. and for a time so limited as not to advance the resin materially toward the C-stage. Thus we can heat it at 250° F. for 10 seconds. We find that this intermediate heating serves as a levelling influence. If the sheet contains an undesirably high level of volatiles, this preheating serves to drive off the excess. If on the other hand the sheet should happen to be too dry, i. e., below 10% volatiles, the preheating seems to soften the sheet so that it does not crack or thin out excessively in the cold embossing step. The only heat supplied to the embossing equipment, when cold embossing is used in the preferred practice of our invention, is the slight amount of heat which is supplied as residual heat in the preheated sheet fed into the embosser.

Preheating of the dried sheet prior to cold embossing is optional and can be eliminated if the dried sheet has the proper volatile content.

After the sheet leaves the embosser, we prefer to pass it through a pair of spaced flat rolls to reduce the height of the ribs to a predetermined and constant value. Since the sheet leaving the embosser shows a varying degree of retention of the design imparted by the embosser, this retention varying with many factors, we find it advantageous to compress the ribbed sheet to a uniform rib height before feeding it into the curing step.

We next pass the embossed sheet through a curing device in which it is heated at from 300° to 550° F. to completely advance the resin to the C-stage. Although a curing temperature below 400° F. and even as low as 300° F. can be used if the time is sufficiently prolonged, we find that a better separator is produced in a shorter time (not over one minute) at curing temperatures of from 400 to 500° F. Such curing temperatures give a separator having much better abrasion resistance and oxidation resistance than lower curing temperatures, at practical commercial processing times. Use of temperatures of the order of 400 to 500° F. is not ordinarily associated with, and is commonly considered abnormal for, a product based upon cellulose and it was surprising to find that such temperatures could be used in curing our product without deleteriously affecting it in any way. We seldom use a curing temperature above 500° F. since it may tend to injure the product but we can use curing temperatures as high as 550° F. if we use extremely short curing dwell, i. e., if we pass the sheet through the curing zone at extremely high speeds so as to minimize the possibility of thermal injury to the cellulose.

We prefer to effect curing by passing the sheet through a heated slot formed by heated cooperating upper and lower metal plates which are spaced apart so as to form a slot slightly deeper than the overall thickness of the embossed web. The curing is complete in one minute at a platen temperature of about 450° F.

Curing serves to permanently set the web and the ribs embossed therein.

The hot cured embossed web which leaves the curing device is then contacted, as by immersion or spraying, with an aqueous solution of a wetting agent of any suitable type which will facilitate wetting of the finished separator by the battery acid. We have found that penetration of the aqueous solution of the wetting agent, which penetration is necessary for good later penetration by the battery acid, is expedited greatly by introducing a portion of the total wetting agent in the water-alcohol or water-acetone resin impregnating solution and applying the remainder as an aqueous solution to the hot cured sheet which is emerging from the curing device. Examples of suitable wetting agents are "Aerosol OT" (the dioctyl ester of sodium sulfo-succinic acid) and the "Tergitols" which are sulfates of the branched chain $C_8$ and higher aliphatic saturated alcohols. The above-described mode of applying the wetting agent is the subject of our co-pending applications Serials Nos. 240,313 and 240,315, filed of even date herewith, now U. S. Patents 2,662,107 and 2,662,032, respectively. After application of the aqueous solution of the wetting agent, we prefer to allow the sheet or separator to stand several hours, say 5 to 10 hours, under such conditions that relatively little evaporation of water takes place, in order to allow the wetting agent to completely and uniformly penetrate the cured product.

The cured sheet is cut to width and length, thereby giving the finished separator which is ready for use in the battery provided the above-mentioned standing period elapses before contact with the battery acid.

Production of our separators can be either batchwise or continuous, the latter being preferred.

*Example*

A cotton linters sheet which exhibited uniform "formation" and had a Gurley air permeability of 3 to 4 seconds and a web gauge of 0.033" was immersed in the following solution:

| | Parts by weight |
|---|---|
| Durez 12704 (a straight phenol-$CH_2O$ resin dilutable in water to at least 20:1; contains 70% non-volatiles and about 26% water)* | 1575 |
| Isopropanol (91% alcohol, 9% water) | 706 |
| Tergitol 08 (wetting agent** 45% solids, 55% water) | 25 |
| Added water | 281 |

\* It will be seen that the A-stage phenolic resin as received from the manufacturer contained 26% water but that this water is not taken into account in calculating the relative amounts of added water and alcohol forming the solvent in which the resin is dissolved to form the impregnating solution.
\*\* The sodium salt of sulfated 2-ethylhexyl alcohol.

This solution contained about 43% of non-volatile resin solids and about 1% of wetting agent based on actual non-volatile resin solids. The saturated sheet was squeezed so that the solution pickup corresponded to about 39% of actual non-volatile resin solids based on dry fibers plus non-volatile resin solids. This sheet was then dried for 2 minutes to 18–24% volatiles based on net dry sheet, drying being done by air at 300° F. flowing concurrently and dropping to room temperature. The sheet was then preheated to 250° F., passed through embossing rolls which were not positively heated, then cured by heating to 450–500° F. for one minute in the manner described above and cut to battery separator size. As the sheet left the curing zone and while it was at approximately 400° F. it was sprayed with a 3% water solution of "Tergitol 08" which was picked up in an amount corresponding to 1½% by weight of the wetting agent based on the resin content of the sheet. The cut separators were allowed to stand seven hours under relatively non-evaporative conditions to secure good distribution of the wetting agent throughout all portions of the separators.

The resulting separators had outstanding chemical, electrical and mechanical properties and easily met the rigid specifications imposed upon a separator which is to compete with Douglas fir separators. The separators of this example had an electrical resistance of 0.03–0.04 ohm per square inch in battery acid.

It is to be noted that an electrical resistance of 0.05 ohm per square inch is the acceptable maximum that can be tolerated in automotive batteries. Our invention makes it easily possible to attain a value of 0.03–0.04 which is well below the maximum. The separators of our invention are extraordinary in their low electrical resistance which is evidenced by the 300 ampere discharge rate of a battery made with our separators.

In Figs. 1 and 2 of the drawings, reference numeral 1 designates the separator and 2 denotes the integral upstanding spaced ribs formed therein by embossing the dried sheet before curing the resin content thereof. The flow diagram of Fig. 3 will be self-explanatory.

From the foregoing many advantages of our separator will be obvious to those skilled in the art. Our use of a selected alcohol-water or acetone-water mixture instead of a solvent which is predominantly or entirely water offers many advantages including the following:

1. It gives a separator of higher abrasion resistance.
2. It gives a separator with uniform resin distribution, by avoiding the migration of resin to the surface, which can occur with an all water resin solvent, especially at low water dilutability for the resin.
3. It gives a separator which has low electrical resistance and is satisfactory in all other respects.
4. It prevents excessive weakening or tenderizing of the cellulosic fiber sheet during impregnation, so that tearing of the sheet is avoided without the necessity for special handling.
5. It enables the use of resins of lower water dilutability than thought possible by Uber, without resin migration. Thus, as stated above, we can use a resin having a water dilutability as low as 0.1 part water per part of resin. For example we found such a resin, which was an experimental resin supplied by Monsanto Chemical Company, to be infinitely dilutable with a 50 isopropanol-50 water mixture and with a 75 isopropanol-25 water mixture, and we used it successfully in our invention without any evidence of resin migration. We now believe that the only reason Uber specified at least 9:1 dilutability with water was because he found that at lower dilutability excessive resin migration from the center of his sheet took place.

It is a great advantage to be able to make a successful separator from a resin of lower water dilutability than 9:1 because the highly dilutable resins are perishable, i. e., upon standing their dilutability with water drops rapidly so that they soon are lower than 9:1 and then cannot be used according to Uber.

Our invention makes possible the commercial production of phenolic resin-impregnated cellulosic fibrous sheet separators at low cost, in a simple manner and with simple equipment. In fact we believe that we are the first to make on a commercial scale, such separators which would meet the rigid specifications imposed. Another advantage is the high production speed made possible by our invention, since we can, by operating continuously, carry out our entire operation from original base sheet to finished separator in less than five minutes. Another advantage of our invention is that it enables cold embossing to be carried out. Another advantage is that our invention carries out embossing prior to curing so that the curing causes permanent retention of the embossed shape, whereas embossing of a cured sheet would present difficulties. Another advantage is that our high curing temperature gives a better separator. Other advantages of our invention will be apparent to those skilled in the art.

The separators of our invention do not need to be conditioned or maintained wet until the battery acid is added. Batteries can be assembled dry with the separators of this invention and kept dry indefinitely before the battery acid is added without any damage.

The battery separator described herein is the subject of our co-pending application Serial No. 240,312, filed of even date herewith, and now Patent Number 2,662,106.

Having thus described our invention, what we claim and desire to protect by Letters Patent is:

1. The process of making a liquid permeable battery separator which comprises thoroughly impregnating a single thickness of a normally dry bibulous cellulosic fibrous sheet having an alpha cellulose content of at least 90 per cent and an air permeability (Gurley) of from 1 to 10 seconds and exhibiting uniform formation with a solution of an A-stage phenol-formaldehyde resin in a solvent composed of from 10 to 50 per cent by weight of water and correspondingly from 90 to 50 per cent by weight of a material selected from the group consisting of alkanols having not more than three carbon atoms per molecule and acetone, said solution containing non-volatile resin solids in a concentration of from 13 to 50 per cent by weight, and thereby causing said sheet to pick up from 120 to 250 per cent by weight of said solution based on the fiber, drying said sheet and thereby depositing in and around the fibers of the sheet said resin in an amount corresponding to from 25 to 50 per cent by weight of C-stage resin based on fiber plus cured resin, said resin being so distributed that upon conversion to the C-stage it will protect said fibers against attack by battery acid but will not lessen materially the air permeability of the sheet, heating the dried single sheet to advance said resin to the C-stage, and cutting the resulting single sheet into battery separators.

2. A process as defined in claim 1 wherein said sheet is heated at from 400° to 500° F. to advance said resin to the C-stage.

3. The process of making a liquid permeable battery separator which comprises thoroughly impregnating a single thickness of a normally dry bibulous cellulosic fibrous sheet having an alpha cellulose content of at least 90 per cent and an air permeability (Gurley) of from 1 to 10 seconds and exhibiting uniform formation with a solution of an A-stage phenol-formaldehyde resin in a solvent composed of from 10 to 50 per cent by weight of water and correspondingly from 90 to 50 per cent of isopropyl alcohol, said solution containing non-volatile resin solids in a concentration of from 13 to 50 per cent by weight, and thereby causing said sheet to pick up from 120 to 250 per cent by weight of said solution based on the fiber, drying said sheet and thereby depositing in and around the fibers of the sheet said resin in an amount corresponding to from 25 to 50 per cent by weight of C-stage resin based on fiber plus cured resin, said resin being so distributed that upon conversion to the C-stage it will protect said fibers against attack by battery acid but will not materially lessen the air permeability of the sheet, heating the dried single sheet to advance said resin to the C-stage, and cutting the resulting single sheet into battery separators.

4. The process of making a liquid permeable battery separator which comprises thoroughly impregnating a single thickness of a normally dry bibulous cellulosic fibrous sheet having an alpha cellulose content of at least 90 per cent and an air permeability (Gurley) of from 1 to 10 seconds and exhibiting uniform formation with a solution of an A-stage phenol-formaldehyde resin in a solvent composed of from 25 to 40 per cent by weight of water and correspondingly from 75 to 60 per cent by weight of a material selected from the group consisting of alkanols having not more than three carbon atoms per molecule and acetone, said solution containing non-volatile resin solids in a concentration of from 13 to 50 per cent by weight, and thereby causing said sheet to pick up from 120 to 250 per cent by weight of said solution based on the fiber, drying said sheet and thereby depositing in and around the fibers of the sheet said resin in an amount corresponding to from 30 to 45 per cent by weight of C-stage resin based on fiber plus cured resin, said resin being so distributed that upon conversion to the C-stage it will protect said fibers against attack by battery acid but will not lessen materially the air permeability of the sheet, heating the dried single sheet to advance said resin to the C-stage, and cutting the resulting single sheet into battery separators.

5. The process of making a liquid permeable battery separator which comprises thoroughly impregnating a single thickness of a normally dry bibulous cellulosic fibrous sheet having an alpha cellulose content of at least 90 per cent and an air permeability (Gurley) of from 1 to 10 seconds and exhibiting uniform formation with a solution of an A-stage phenol-formaldehyde resin in a solvent composed of from 10 to 50 per cent by weight of water and correspondingly from 90 to 50 per cent by weight of a material selected from the group consisting of alkanols having not more than three carbon atoms per molecule and acetone, said solution containing non-volatile resin solids in a concentration of from 13 to 50 per cent by weight, and thereby causing said sheet to pick up from 120 to 250 per cent by weight of said solution based on the fiber, drying said sheet to a volatile content of from 10 to 25 per cent by weight and thereby depositing in and around the fibers of the sheet said resin in an amount corresponding to from 25 to 50 per cent by weight of C-stage resin based on fiber plus cured resin, said resin being so distributed that upon conversion to the C-stage it will protect said fibers against attack by battery acid but will not lessen materially the air permeability of the sheet, embossing the resulting sheet while it still has a volatile content of from 10 to 25 per cent left therein in said drying step and while the said sheet is at a temperature of not over 250° F., the only heat supplied in said embossing step being the residual heat in said sheet, and thereby deforming said sheet along spaced lines to form spaced integral protuberant portions on one side thereof and corresponding depressed portions on the other side without cracking or weakening the sheet, heating the embossed single sheet to advance said resin to the C-stage, and cutting the resulting single sheet into battery separators.

6. A process as defined in claim 5 wherein said embossed sheet is heated at from 400° to 500° F. to advance said resin to the C-stage.

7. The process of making a liquid permeable battery separator which comprises thoroughly impregnating a single thickness of a normally dry bibulous cellulosic fibrous sheet having an alpha cellulose content of at least 90 per cent and an air permeability (Gurley) of from 1 to 10 seconds and exhibiting uniform formation with a solution of an A-stage phenol-formaldehyde resin having a dilutability with water substantially below 9:1 in a solvent composed of from 10 to 50 percent by weight of water and correspondingly from 90 to 50 per cent by weight of a material selected from the group consisting of alkanols having not more than three carbon atoms per molecule and acetone, said solution containing non-volatile resin solids in a concentration of from 13 to 50 per cent by weight, and thereby causing said sheet to pick up from 120 to 250 per cent by weight of said solution based on the fiber, drying said sheet and thereby depositing in and around the fibers of the sheet said resin in an amount corresponding to from 25 to 50 per cent by weight of C-stage resin based on fiber plus cured resin, said resin being so distributed that upon conversion to the C-stage it will protect said fibers against attack by battery acid but will not lessen materially the air permeability of the sheet, heating the dried single sheet to advance said resin to the C-stage, and cutting the resulting single sheet into battery separators.

References Cited in the file of this patent

UNITED STATES PATENTS

| Number | Name | Date |
|---|---|---|
| 2,198,805 | Dillehay | Apr. 30, 1940 |
| 2,303,395 | Schultz et al. | Dec. 1, 1942 |
| 2,406,653 | Batchelor | Aug. 27, 1947 |
| 2,482,525 | Wachter | Sept. 20, 1949 |
| 2,543,137 | Uber | Feb. 27, 1951 |
| 2,591,754 | Wilson et al. | Apr. 8, 1952 |